United States Patent [19]
Fischer et al.

[11] 3,814,268
[45] June 4, 1974

[54] BULK MATERIAL SCRAPER

[75] Inventors: Gerhard Fischer, Dortmund-Kirchhorde; Günter Ströcker, Holzwickede Kreis Unna, both of Germany

[73] Assignee: Gustav Schade Maschinenfabrik, Dortmund, Germany

[22] Filed: Nov. 1, 1972

[21] Appl. No.: 302,844

[30] Foreign Application Priority Data
Nov. 24, 1971 Germany.............................. 2158172

[52] U.S. Cl.................................... 214/10, 198/36
[51] Int. Cl............................................. B65g 65/28
[58] Field of Search .............. 214/10; 198/36, 9, 77, 198/91, 102, 164; 37/192

[56] References Cited
UNITED STATES PATENTS
3,557,934  1/1971  Schade.................. 214/10
3,621,977  11/1971  Fischer.................. 214/10 X
3,708,056  1/1973  Ströcker.................. 214/10 X FOREIGN PATENTS OR APPLICATIONS
1,148,425  4/1969  Great Britain........................ 198/36

Primary Examiner—Frank E. Werner
Attorney, Agent, or Firm—Meyer, Tilberry & Body

[57] ABSTRACT

A bulk material scraper includes a gantry spanning a dump pile and having an articulated jib supported thereon for raising and lowering movement. The articulated jib is laterally supported by the gantry in all positions of the jib during raising and lowering movement thereof.

15 Claims, 9 Drawing Figures

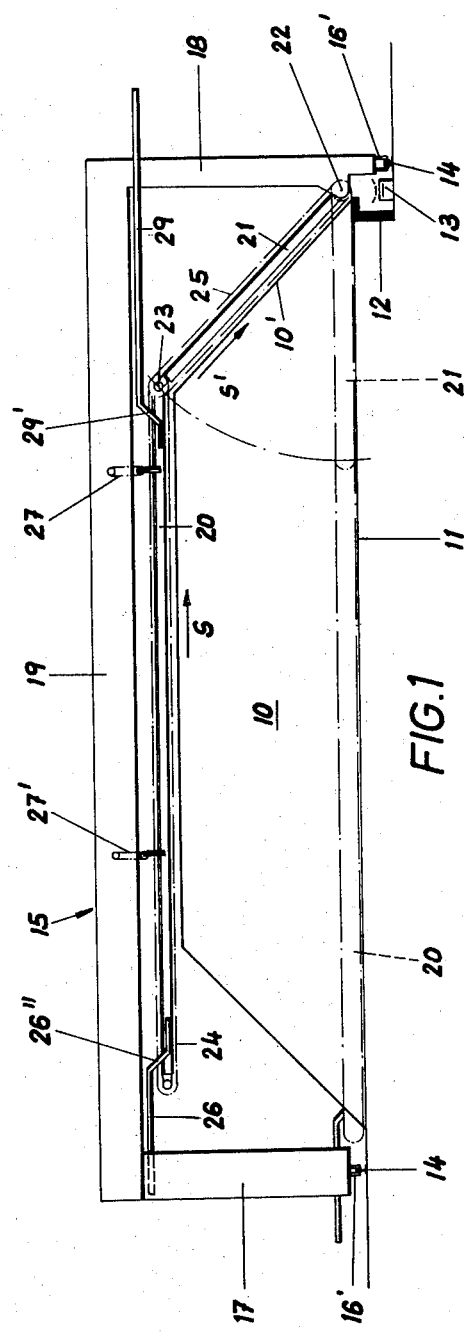
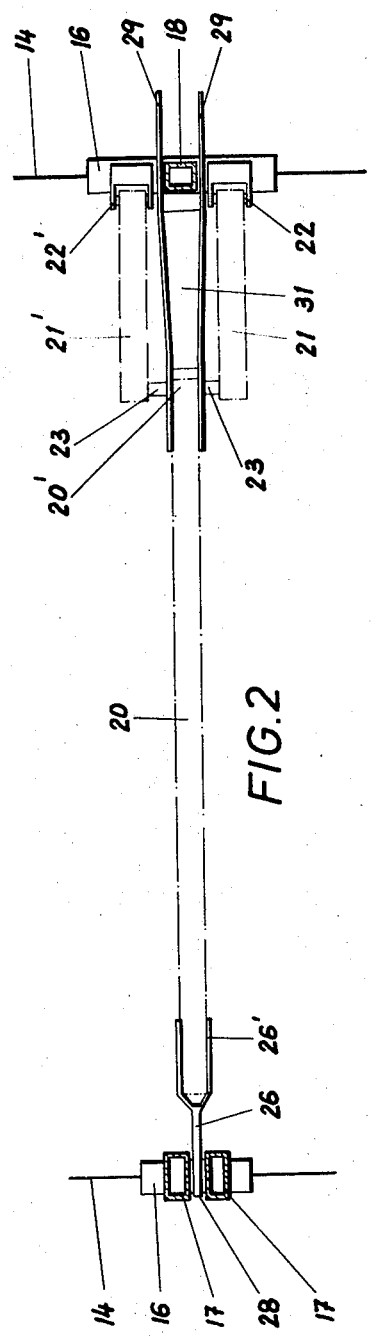
FIG.1
FIG.2

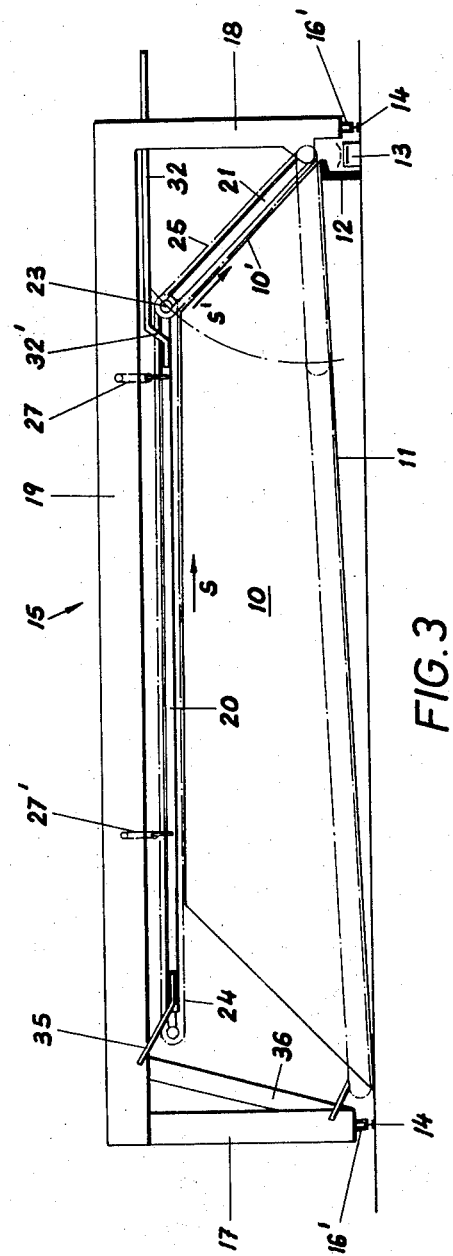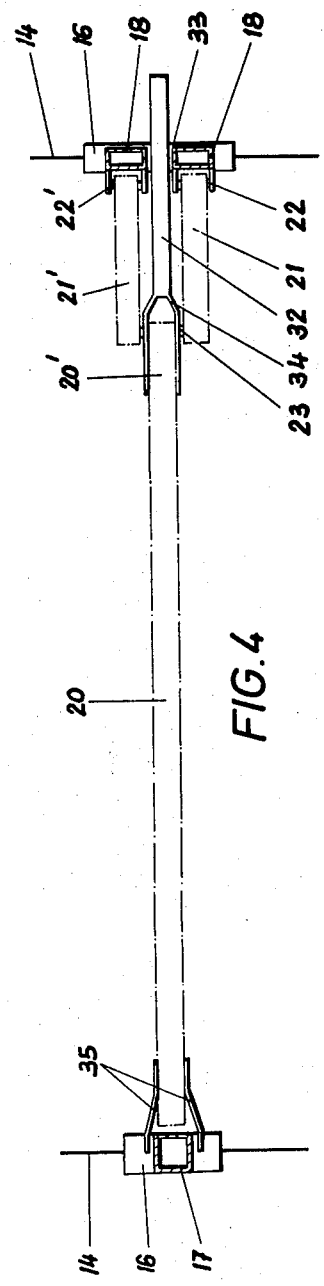

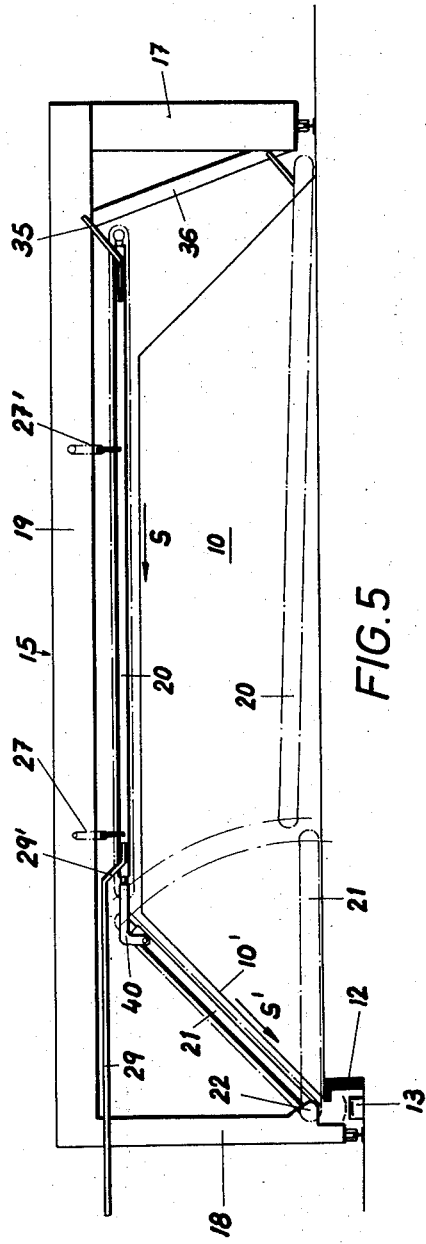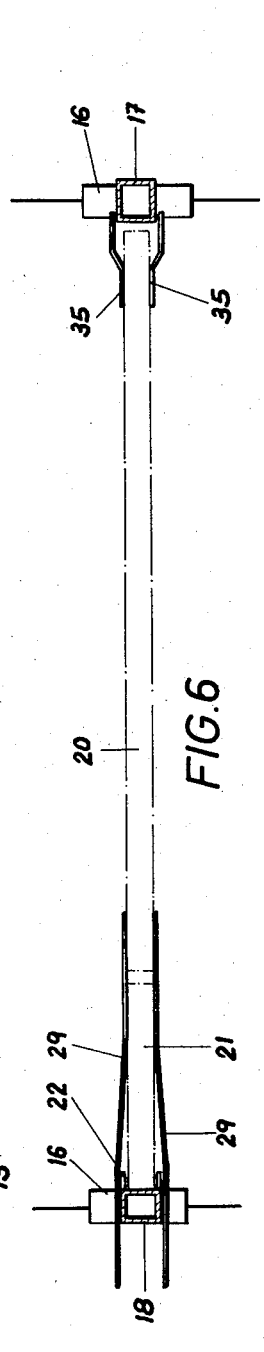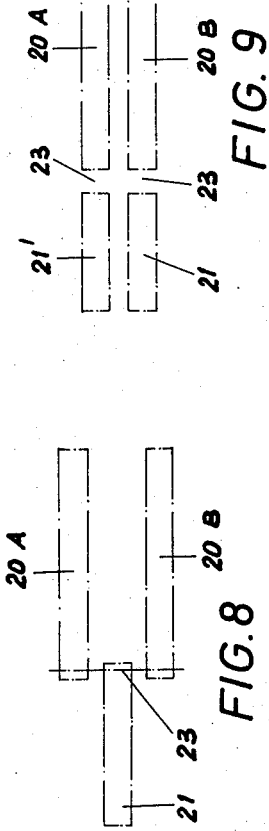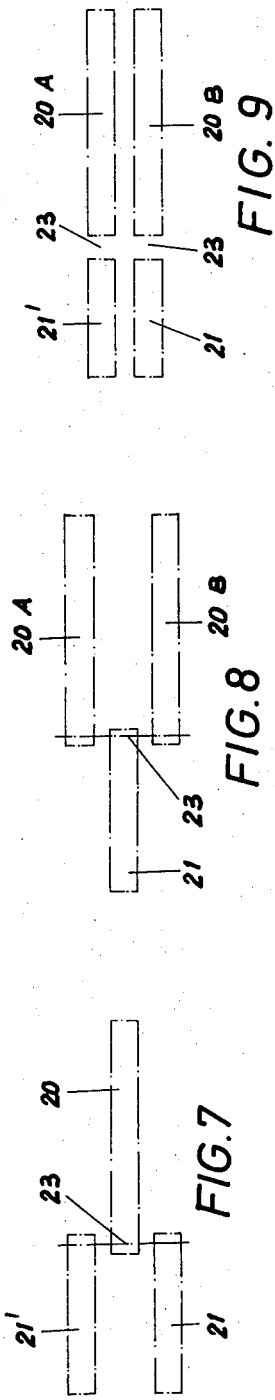

BULK MATERIAL SCRAPER

BACKGROUND OF THE INVENTION

This application relates to material handling equipment and more particularly to an articulated scraper for removing bulk material from storage pile.

There are many types of scraper devices for removing bulk material from storage piles. Such scrapers commonly include an articulated jib including a pair of jib members hingedly connected together at their ends for relative pivotal movement in a substantially vertical plane. One of the jib members scrapes material from one surface of the dump pile and transfers the material to the other jib member which scrapes across another surface of the dump pile. The jib members usually have separate scraper chain drives for driving scraper buckets relative to the jib members.

Scrapers of the type described are generally used for removing bulk material from dump piles having a triangular cross-sectional shape. Dump piles having a triangular cross-sectional shape have a relatively small base width. One type of scraper for removing bulk material from a storage pile having a triangular cross-sectional shape is shown in Austrian Patent No. 224,016. In a scraper of this type, a first jib element of an articulated jib is pivoted or hinged to the gantry near the base of the dump pile. The other jib member is hinged to the first jib member and has its free end laterally supported and guided by the gantry by a roller guideway. In a scraper of this type, the first jib element scrapes bulk material up one sloping face of the dump pile for transfer to the second jib member which scrapes the bulk material down the opposite sloping face of the dump pile.

Scrapers for removing bulk material from storage piles having a trapezoidal cross-sectional shape are also known. Dump piles having a trapezoidal cross-sectional shape have a relatively large base width as compared to a dump pile having a triangular cross-sectional shape. In devices for clearing bulk material from a dump pile having a trapezoidal cross-sectional shape, one jib member works in a substantially horizontal position on the flat upper surface of the dump pile. One scraper of this general type is shown in German Utility Model Patent No. 1,967,173.

As compared to scraper devices having rigid scraper jibs, scraper devices having articulated jibs have a disadvantage because the articulation joint between the jib members impairs the transverse or lateral stability of the jib. Due to the lack of lateral stability, scraper devices having articulated jibs are economically feasible for use only on dump piles which are not extremely wide. Furthermore, hardened or frozen bulk material which tends to stick makes transfer very difficult in the area of the articulation joint. Therefore, clearing of the dump pile is difficult and the capacity or rate at which the scraper can remove material from the scraper pile is greatly reduced.

SUMMARY

A scraper of the type described having an articulated jib includes a movable gantry spanning an elongated dump pile for movement therealong.

The articulated jib includes first and second jib members. The first jib member is supported by the gantry for raising and lowering movement in a substantially horizontal position. The second jib member is hingedly connected to the first jib member at an articulation joint and is also hingedly connected to the gantry adjacent the base of the dump pile.

Lateral support means is provided for laterally supporting the articulated jib relative to the gantry. The lateral support means comprises outwardly projecting extensions connected to the opposite end portions of the first jib member.

For relatively wide dump piles having a trapezoidal cross-sectional shape, the first or horizontal jib member is substantially longer than the second or inclined jib member. Preferably, the first jib member is longer than the second jib member by a whole multiple. In accordance with the invention, the first or horizontal jib member is laterally supported at both its ends by the gantry during raising and lowering movement of the first jib member. Bending stresses and lateral deformation of the articulated jib is greatly reduced and the articulation joint is not subjected to high lateral forces. Additionally, no large lateral forces are transferred from the first or horizontal jib member to the second or inclined jib member. This arrangement makes it possible to use an articulated jib while avoiding excessive costs and reinforced structures for increasing the stability of the jib.

In accordance with one arrangement, the first or horizontal jib member has an articulation joint end portion and an opposite end portion. The opposite end portion thereof has an elongated lateral supporting structural member attached thereto and extending outwardly therefrom substantially parallel to the longitudinal axis of the first jib member. The gantry has a vertical guide slot in which the elongated structural member is slidably received. The lateral supporting structural member may have a bifurcated attaching portion to include a pair of laterally spaced-apart attaching arms located on opposite sides of the opposite end portion of the first jib member. The extension portion of the lateral supporting structural member is spaced above the attaching portion. The lateral supporting structural member includes an upwardly and outwardly inclined portion extending from the attaching portion to the extension portion. With this arrangement, the extension portion of the lateral support will be spaced above the articulation joint and the bottom structural members on the gantry when the articulated jib is in its lowermost substantially horizontal position.

The lateral support on the articulation joint end of the first jib member includes a bifurcated portion having a pair of laterally spaced-apart extension arms positioned on opposite sides of an upright guide member on the gantry. The extension portion of this support means is spaced above the attaching portion in order to clear the articulation joint.

The second jib member of the articulated jib is connected with the first jib member at the articulation joint. The other end portion of the second jib member is hingedly connected with the gantry adjacent the base of the dump pile for pivotal movement in a substantially vertical plane.

The second jib member may comprise a single scraper substantially aligned with the first jib member. In the alternative, the second jib member may be laterally offset relative to the first jib member at the articulation joint. In accordance with a preferred arrangement, the second jib member comprises two parallel spaced-apart scraper jibs positioned on opposite sides of the first jib member at the articulation joint. The support means extends generally between the pair of spaced-apart inclined jib members. With a pair of spaced-apart inclined jib members located on opposite sides of the articulation joint, transfer of bulk material in the zone of the articulation joint from the first jib member to the second jib member is improved.

It will be recognized that it is also possible to arrange the scraper device so that there are two spaced-apart parallel first jib members and only one inclined second jib member. In such an arrangement, both of the first jib members are laterally supported at both of their opposite end portions by the gantry.

The improved scraper of the present invention may be used with dump piles which are elongated along a straight line or along a curved line. The scraper constructed in accordance with the present invention is particularly advantageous for use on extremely wide dumps having a trapezoidal cross-sectional shape. However, the scraper of the present invention is also capable of being used on dumps having triangular cross-sectional shapes.

It is a principal object of the present invention to provide a scraper having an articulated jib which is laterally supported at least at the articulation joint.

It is a further object of the present invention to provide an articulated jib which is very economical to manufacture and assemble.

It is another object of the present invention to provide an improved articulated scraper having lateral supports for reducing stresses and lateral bending of the articulated jib.

It is an additional object of the present invention to provide an articulated jib having lateral support for preventing transfer of forces from one jib member to the other at the articulation joint.

BRIEF DESCRIPTION OF THE DRAWING

The invention may take part in certain parts and arrangements of parts, certain preferred embodiments of which will be described in detail in this specification and illustrated in the accompanying drawing which forms a part hereof.

FIG. 1 is an elevational view of a scraper having the improvements of the present invention incorporated therein;

FIG. 2 is a plan view of the device shown in FIG. 1;

FIG. 3 is an elevational view of another embodiment of a scraper having the improvements of the present invention incorporated therein;

FIG. 4 is a plan view of the device shown in FIG. 3;

FIG. 5 is an elevational view of another embodiment of a scraper having the improvements of the present invention incorporated therein;

FIG. 6 is a plan view of the device shown in FIG. 5;

FIGS. 7, 8 and 9 are diagramatic plan illustrations showing various other articulated jib arrangements with which the improvements of the present invention may be used.

DESCRIPTION OF THE PREFERRED EMBODIMENTS

Referring now to the drawings, wherein the showings are for purposes of illustrating a preferred embodiment of the invention only and not for purposes of limiting same, FIG. 1 shows a bulk material storage dump pile 10 having a trapezoidal cross-sectional configuration including a substantially horizontal upper surface and outwardly inclined opposite surfaces. Dump pile 10 has a floor or base 11 which terminates at one edge at a low substantially vertical wall 12. Laterally adjacent wall 12 is an elongated conveyor belt 13 which extends along dump pile 10. Bulk material removed from dump pile 10 is deposited on conveyor belt 13 for movement to another location.

Rails 14 extend in parallel spaced-apart relationship along the opposite edges of dump pile 10. A gantry 15 spans dump pile 10 and is mounted for movement on rails 14. Gantry 15 includes traveling supports 16 having wheels 16' positioned on rails 14. With the arrangement described, gantry 15 is adapted to be moved along dump pile 10 in either of opposite directions. The direction in which gantry 15 moves may be along a straight line or may be arcuate depending upon whether dump pile 10 extends in a straight line or is arcuate.

Gantry 15 includes two spaced-apart upright legs 17 and 18 connected at their upper ends by a substantially horizontal bridge 19. With legs 17 and 18, and bridge 19, gantry 15 is substantially U-shaped and closely surrounds dump pile 10.

Gantry 15 supports an articulated jib comprising a first or horizontal jib member 20, and two second or inclined jib members 21 and 21'. As seen in FIG. 2, spaced-apart parallel second jib members 21 and 21' are arranged relative to first jib member 20 so that they are offset on opposite sides of first jib member 20. Each second jib member 21 and 21' is mounted for pivotal movement about a substantially horizontal axis on pivot bearings 22 and 22' on gantry support 18 in a location near or adjacent base 11 of dump pile 10. Jib members 21 and 21' may be pivoted in a substantially vertical plane between the full line position shown in FIG. 1 and the position shown by shadow lines.

First jib member 20 has a transfer end portion 20' which extends between second jib members 21 and 21'. Transfer end portion 20' is connected by means of an articulation joint 23 with second jib members 21 and 21'. Articulation joint 23 has a horizontal pivot axis extending substantially parallel to the pivot axis of pivot joints 22 and 22'.

Each jib element 20, 21, and 21' has sprocket wheels rotatably mounted at the opposite ends thereof. Continuous driven chains extend over the sprocket wheels and have scraper elements mounted thereon. The chains on first jib member 20 are generally designated by numeral 24, while those on jib 21 are generally designated by numeral 25. Each jib member has its own chain drive in a known manner.

Material is scraped from dump pile 10 in the direction indicated by arrows S and S'. First jib element 20 is suspended from gantry bridge 19 by winch cables 27 and 27'. During clearing of material from dump pile 10, first jib member 20 can be lowered with its longitudinal axis extending substantially horizontal. First jib member 20 is movable between the full line poition and the shadow line position shown in FIG. 1. In its shadow line position, first jib member 20 is located closely adjacent base or floor 11 of dump pile 10. When first jib member 20 is described as being movable in a substantially horizontal position or movable to a lowermost substantially horizontal position, it will be recognized that it is meant that first jib member 20 is not inclined substantially out of a horizontal position. However, by the words substantially horizontal it is also intended to mean arrangements wherein first jib member 20 is inclined somewhat, including up to around 20°.

Second jib members 21 and 21' are not independently suspended by lifting or lowering cables from gantry 15. During lowering movement of first jib member 20, second jib members 21 and 21' move with first jib member 20 by pivoting in the manner previously described about joints 22 and 22'. During lowering movement of first jib member 20, it will be evident that first jib member 20 also moves longitudinally of its longitudinal axis in a direction opposite to that indicated by arrow S. With jib members 20, 21, and 21' in their lowermost position, their total length is substantially equal to the width of base 11 of dump pile 10. In order to correspond with the cross-sectional shape of dump pile 10, first jib member 20 is longer than second jib members 21 and 21' by a whole multiple value. The length of second jib members 21 and 21' is substantially equal to the maximum length of slope 10' down which bulk material is scraped in the direction of arrow S'.

First jib member 20 may be considered as having first and second opposite end portions or an articulation joint end portion and an opposite end portion. At its opposite end portion remote from articulation joint 23, first jib member 20 has a beam-like supporting projection 26 rigidly secured thereto. This defines a lateral support means for laterally supporting first jib member 20. Projection 26 has a forked or bifurcated head 26' defining an attaching portion which includes laterally spaced-apart attaching arms positioned on opposite sides of the end portion of jib member 20. Outwardly extending extension portion 26 of the lateral support is located above attaching portion 26'. An upwardly and outwardly inclined portion of the lateral support is indicated by numeral 26", and extends upwardly and outwardly from attaching portion 26' to the outwardly extending extension portion. Extension portion 26 of the lateral support extends into a vertical guideway slot 28 on gantry leg 17. Extension portion 26 is laterally supported by the opposite sides of slot 28. Upwardly inclined portion 26" of the lateral support is provided so that extension portion 26 is adequately spaced above travel mechanism 16 on gantry 15 in the lowermost position of first jib member 20.

The articulation joint end portion of first jib member 20 also has a lateral support. This lateral support comprises two elongated beam elements 29 rigidly connected with jib member 20 through an inclined portion 29'. Elongated beam elements 29 comprise a bifurcated extension portion of the lateral support having laterally spaced-apart extension arms which may be connected by cross members 31 for reinforcement purposes. Extension arms 29 engage opposite sides of gantry leg 18 so that first jib member 20 is laterally supported in both of the opposite travel directions of gantry 15.

The lateral support at the articulation joint end portion of first jib member 20 includes an attaching portion which is attached to first jib member 20 and an extension portion defined by elongated extension arms 29. This lateral support also includes an upwardly and outwardly inclined portion 29' extending from the attaching portion to the extension portion. With this arrangement, extension arms 29 are spaced above the attaching portion and above articulation joint 23. The spacing also provides clearance so that extension arms 29 will not interfere with travel mechanisms 16 in the lowermost position of the articulated jib. The lateral support which includes extension arms 29 is also located substantially centrally between parallel spaced-apart second jib membrs 21 and 21'. The length of elongated extension supports 26 and 29 is such that support is provided over the entire movement of first jib member 20. That is, extensions 26 and 29 engage with guides on the gantry when first jib member 20 is in its uppermost solid line position shown in FIG. 1 and in its lowermost shadow line position shown in FIG. 1. The extensions also engage the guides on gantry 15 in all positions between the described uppermost and lowermost positions.

During removal of bulk material from dump pile 10, gantry 15 travels along dump pile 10. If dump pile 10 is designed as an annular dump pile, gantry 15 travels therealong in a circular or acurate path. First jib member 20 is lowered by means of cable winches 27 and 27' so that it bears on the upper surface of dump pile 10. Material is conveyed by the scrapers on first jib member 20 in the direction of arrow S toward slope 10'. The bulk material slides from the upper horizontal surface of dump pile 10 inclined surface 10'. The bulk material is then conveyed down sloping surface 10' over wall 12 onto conveyor belt 30. When the apparatus has reached the end of the dump pile, first jib member 20 is lowered by an amount substantially equal to the cutting depth of its scraper. This simultaneously pivots second jib members 21 and 21' downwardly by a predetermined amount for cutting into sloping surface 10'. The gantry then travels in the opposite direction along dump pile 10 and clears additional bulk material by an amount equal to the further cutting depth to which first jib member 20 has been lowered. This procedure is repeated until dump pile 10 has been substantially removed over its entire cross section. The articulated jib is then substantially in the shadow line position shown in FIG. 1 closely adjacent dump floor 11.

FIGS. 3 and 4 show another embodiment which is substantially similar to the embodiment of FIGS. 1 and 2 except that dump floor 11 is designed as a ramp which inclines upwardly with a small slope from left to right as viewed in FIG. 3 to vertical wall 12. In the embodiment of FIGS. 3 and 4, the articulation joint end portion of first jib member 20 has a lateral support defined by elongated guide beam 32 which is slidably received through a vertical slot 33 in gantry leg 18. This is similar to the arrangement described with respect to guide extension portion 26 in FIGS. 1 and 2. Elongated support beam 32 has an upwardly and outwardly inclined portion 32', and is rigidly secured by a bifurcated portion 34 to the opposite side of first jib member 20. Bifurcated member 34 defines an attaching portion having laterally spaced-apart attaching arms for attaching support 32 to first jib member 20.

The opposite end of first jib member 20 has a relatively short forked or bifurcated member 35 laterally embracing an oblique or inclined strut 36 on gantry 15. Support member 35 has spaced-apart extension arms which extend on opposite sides of inclined strut 36. With the arrangement described, both of the opposite ends of first jib member 20 are laterally supported by gantry 15 so that articulation joint 23, along with second jib members 21 and 21', are relieved of any lateral load or bending stresses acting on first jib member 20.

As seen in FIGS. 2 and 4, a lateral guideway clearance is provided for lateral supports 26, 29, 32 and 35. The clearance is provided in such a manner that the supports are not supported on the guiding faces of the gantry when first jib member 20 is not laterally loaded. Therefore, when first jib member 20 is not under any lateral load, it is possible to raise or lower the articulated jib without encountering frictional resistance due to engagement between the lateral support means. The clearance is such that lateral supporting is automatically provided as soon as the apparatus is put into operation and a lateral load is exerted on first jib member 20. During the slightest degree of bending or lateral displacement of first jib member 20, the described support means pass into engagement with the lateral faces of the guides on gantry 15.

In accordance with another arrangement, it will be recognized that it is possible to guide the support on the gantry by means of slideways or roller guideways. Even in such arrangements, it is important that first jib member 20 be laterally supported at both of its operations over its entire zone of movement.

Instead of providing two second or inclined jib members 21 and 21', it will be recognized that it is possible to provide only a single inclined jib 21 arranged in alignment with first jib member 20. Such an arrangement is shown in FIGS. 5 and 6. First jib member 20 is hinged at an articulation joint to second or inclined jib 21 by angle or L-shaped arms 40. The opposite end portion of first jib member 20 is laterally supported by an upwardly inclined forked or bifurcated support member 35 positioned on both sides of gantry strut 36. The articulation joint end portion of first jib member 20 is laterally supported by support beam 29 which is angled upardly at 29' and bifurcated to embrace gantry leg 18 on both of its opposite outer surfaces. L-shaped arms 40 forming the articulation joint are designed so that the end portion of first jib member 20 is located somewhat above the adjacent end of second jib member 21 in the lowermost position of the two jib members. This insures good transfer of material from first jib member 20 to second jib member 21 in the zone of the articulation joint as the articulated jib member approaches its lowermost position.

FIGS. 7, 8 and 9 are diagramatic showings of other articulated jib arrangements with which the principles of the present invention can be used. FIG. 7 shows an arrangement somewhat corresponding to the examples according to FIGS. 1–4, and wherein a long first jib member 20 is sequentially connected to inclined jibs 21 and 21'. Inclined second jib members 21 and 21' are connected by an articulation joint 23 with first jib member 20. Jib member 20 is laterally supported at both of its opposite ends by gantry 15 in the manner as described with reference to FIGS. 1–4.

FIG. 8 shows an arrangement wherein the articulated jib has only a single sequentially connected inclined jib 21 and two horizontal or first jib members 20a and 20b. Second jib member 21 is connected between first jib members 20a and 20b by an articulation joint. As seen in plan view, jib members 20a and 20b are laterally offset relative to inclined jib 21. In this design, it is self evident that the opposite end portions of both jib members 20a and 20b are laterally supported at both of their opposite ends as described with reference to FIGS. 1–6.

FIG. 9 shows an arrangement wherein the scraper includes two parallel spaced-apart articulated jibs. Each of the pair of articulated jibs includes a first or horizontal jib member 20a or 20b, and a second or inclined jib member 21' or 21. These are connected by an articulation joint 23 in the manner previously described. Each of the pair of articulated jibs can be individually suspended for raising and lowering movement relative to gantry 15. Naturally, each of the horizontal or first jib members is laterally supported at both of its opposite ends by the gantry in the manner previously described.

Even though many embodiments include a pair of parallel spaced-apart jib members, it will be recognized that for purposes of description inclined jib members 21 and 21' may be described together as a second jib member. That is, just because the description states that a first or a second jib member is provided does not mean that that first or second jib member could not include more than one scraper jib.

Although the invention has been shown and described with respect to certain preferred embodiments, it is obvious that equivalent alterations and modifications will occur to others skilled in the art upon the reading and understanding of this specification. The present invention includes all such equivalent alterations and modifications and is limited only by the scope of the claims.

Having thus described our invention, we claim:

1. In an apparatus for removing bulk material from the storage pile having a base, said apparatus including movable gantry means for spanning said pile and being movable along said pile, scraper jib means supported on said gantry for scraping material from said pile, said scraper jib means including at least first and second jib members, said first jib member having first and second opposite end portions and a longitudinal axis, support means for movably supporting said first jib member on said gantry for raising and lowering movement with said longitudinal axis thereof in a substantially horizontal position, said second jib member having first and second opposite end portions, said first end portion of said second jib member being pivotally connected to said gantry adjacent said base of said pile for pivotal movement of said second jib member in a substantially vertical plane, said second end portion of said second jib member being pivotally connected with said second end portion of said first jib member at an articulation joint, said articulation joint being movable in an arcuate path during raising and lowering movement of said first jib member so that said first jib member also moves in a direction generally parallel to its longitudinal axis during raising and lowering movement thereof, the improvement comprising; lateral support means extending between at least one of said first and second end portions of said first jib member and said gantry means for laterally supporting said scraper jib means in all positions thereof during raising and lowering movement of said first jib member, said lateral support means comprises an elongated structural member extending outwardly from said one end portion in a direction generally parallel to said longitudinal axis of said first jib member, said structural member includes an attaching portion attached to said one end portion and an extension portion spaced above said attaching portion and extending outwardly from said one end portion, said structural member being upwardly and outwardly inclined from said attaching portion to said extension portion.

2. In an apparatus for removing bulk material from a storage pile having a base, said apparatus including movable gantry means for spanning said pile and being movable along said pile, scraper jib means supported on said gantry for scraping material from said pile, said scraper jib means including at least first and second jib members, said first jib member having first and second opposite end portions and a longitudinal axis, support means for movably supporting said first jib member on said gantry for raising and lowering movement with said longitudinal axis thereof in a substantially horizontal position, said second jib member having first and second opposite end portions, said first end portion of said second jib member being pivotally connected to said gantry adjacent said base of said pile for pivotal movement of said second jib member in a substantially vertical plane, said second end portion of said second jib member being pivotally connected with said second end portion of said first jib member at an articulation joint, said articulation joint being movable in an arcuate path during raising and lowering movement of said first jib member so that said first jib member also moves in a direction generally parallel to its longitudinal axis during raising and lowering movement thereof, the improvement comprising; lateral support means extending between at least one of said first and second end portions of said first jib member and said gantry means for laterally supporting said scraper jib means in all positions thereof during raising and lowering movement of said first jib member, said lateral support means comprises an elongated structural member extending outwardly from said one end portion in a direction generally parallel to said longitudinal axis of said first jib member, said structural member includes an attaching portion and an extension portion, and said gantry means includes upright guide means for guiding said structural member, said extension portion is bifurcated to include laterally spaced-apart arms positioned on opposite sides of said guide means.

3. In an apparatus for removing bulk material from a storage pile having a base, said apparatus including movable gantry means for spanning said pile and being movable along the pile, scraper jib means supported on said gantry for scraping material from said pile, said scraper jib means including at least first and second jib members, said first jib member having first and second opposite end portions and a longitudinal axis, support means for movably supporting said first jib member on said gantry for raising and lowering movement with said longitudinal axis thereof in a substantially horizontal position, said second jib member having first and second opposite end portions, said first end portion of said second jib member being pivotally connected to said gantry adjacent said base of said pile for pivotal movement of said second jib member in a substantially vertical plane, said second end portion of said second jib member being pivotally connected with said second end portion of said first jib member at an articulation joint, said articulation joint being movable in an arcuate path during raising and lowering movement of said first jib member so that said first jib member also moves in a direction generally parallel to its longitudinal axis during raising and lowering movement thereof, the improvement comprising; lateral support means extending between at least one of said first and second end portions of said first jib member and said gantry means for laterally supporting said scraper jib means in all positions thereof during raising and lowering movement of said first jib member, said lateral support means comprises an elongated structural member extending outwardly from said one end portion in a direction generally parallel to said longitudinal axis of said first jib member, said structural member includes an attaching portion and an extension portion, and said gantry means includes upright guide means for guiding said structural member, said attaching portion is bifurcated to include laterally spaced-apart attaching arms positioned on opposite sides of said one end portion.

4. In an apparatus for removing bulk material from a storage pile having a base, said apparatus including movable gantry means for spanning said pile and being movable along said pile, scraper jib means supported on said gantry for scraping material from said pile, said scraper jib means including at least first and second jib members, said first jib member having first and second opposite end portions and a longitudinal axis, support means for movably supporting said first jib member on said gantry for raising and lowering movement with said longitudinal axis thereof in a substantially horizontal position, said second jib member having first and second opposite end portions, said first end portion of said second jib member being pivotally connected to said gantry adjacent said base of said pile for pivotal movement of said second jib member in a substantially vertical plane, said second end portion of said second jib member being pivotally connected with said second end portion of said first jib member at an articulation joint, said aritculation joint being movable in an arcuate path during raising and lowering movement of siad first jib member so that said first jib member also moves in a direction generally parallel to its longitudinal axis during raising and lowering movement thereof, the improvement comprising; lateral support means extending between at least one of said first and second end portions of said first jib member and said gantry means for laterally supporting said scraper jib means in all positions thereof during raising and lowering movement of said first jib member, said lateral support means comprises first and second lateral support members, one of said lateral support members being attached to each of said first and second end portions of said first jib member.

5. The device of claim 4 wherein said gantry includes upright guide means and said support members extend closely adjacent said guide means.

6. The device of claim 5 wherein said guide means includes an upright guideway slot and at least one of said support members includes an extension portion received in said slot.

7. The device of claim 6 wherein said guide means includes an upright guide member and the other of said lateral support members includes a bifurcated extension portion having laterally spaced-apart extension arms positioned on opposite sides of said upright guide member.

8. In an apparatus for removing bulk material from storage pile having a base, said apparatus including movable gantry means for spanning said pile and being movable along said pile, scraper jib means supported on said gantry for scraping material from said pile, said scraper jib means including at least first and second jib members, said first jib member having first and second opposite end portions and a longitudinal axis, support means for movably supporting said first jib member on said gantry for raising and lowering movement with said longitudinal axis thereof in a substantially horizontal position, said second jib member having first and second opposite end portions, said first end portion of said second jib member being pivotally connected to said gantry adjacent said base of said pile for pivotal movement of said second jib member in a substantially vertical plane, said second end portion of said second jib member being pivotally connected with said second end portion of said first jib member at an articulation joint, said articulation joint being movable in an arcuate path during raising and lowering movement of said first jib member so that said first jib member also moves in a direction generally parallel to its longitudinal axis during raising and lowering movement thereof, the improvement comprising; lateral support means extending between at least one of said first and second end portions of said first jib member and said gantry means for laterally supporting said scraper jib means in all positions thereof during raising and lowering movement of said first jib member, said lateral support means is on said second end portion of said first jib member and said second jib member includes a pair of laterally spaced-apart inclined jib members, said support means extending between said inclined jib members.

9. In an apparatus for removing bulk material from storage pile having a base, said apparatus including movable gantry means for spanning said pile and being movable along said pile, scraper jib means supported on said gantry for scraping material from said pile, said scraper jib means including at least first and second jib members, said first jib member having first and second oposite end portions and a longitudinal axis, support means for movably supporting said first jib member on said gantry for raising and lowering movement with said longitudinal axis thereof in a substantially horizontal position, said second jib member having first and second opposite end portions, said first end portion of said second jib member being pivotally connected to said gantry adjacent said base of said pile for pivotal movement of said second jib member in a substantially vertical plane, said second end portion of said second jib member being pivotally connected with said second end portion of said first jib member at an articulation joint, said articulation joint being movable in an arcuate path during raising and lowering movement of said first jib member so that said first jib member also moves in a direction generally parallel to its longitudinal axis during raising and lowering movement thereof, the improvement comprising; lateral support means extending between at least one of said first and second end portions of said first jib member and said gantry means for laterally supporting said scraper jib means in all positions thereof during raising and lowering movement of said first jib member, said scraper means includes laterally spaced-apart pairs of said first and second jib members and said support means extends between said gantry and both of said first and second end portions of said first jib member on each of said pair of jib members.

10. The device of claim 4 wherein said second support means form a rearward extension of said first jib member extending outwardly from a point adjacent said articulation joint to the portion of said gantry arranged above the pivotal connection of said second jib and said gantry for laterally supporting said second end of said first jib member during raising and lowering movement thereof.

11. The device of claim 10 wherein said second lateral support means is attached to said first jib member with its longitudinal axis vertically offset to the longitudinal axis of said first jib member whereby said second lateral support member is positioned a distance above said longitudinal axis of said first jib member.

12. The device of claim 11 wherein said axes extend substantially parallel.

13. The device of claim 10 wherein said first lateral support means at said first end portion of said first jib member form an extension of said first jib member, the longitudinal axis of said extension being vertically offset to the longitudinal axis of said first jib member whereby said extension of said first lateral support means is positioned a distance above said longitudinal axis of said first jib member.

14. The device of claim 13 wherein said longitudinal axis of said extension of said first lateral support means extends substantially parallel to said longitudinal axis of first jib member.

15. The device of claim 10 wherein said second lateral support mean comprises parallel first and second lateral support members each forming an extension of said first jib member, said lateral support members being attached at opposite sides of said first jib member adjacent to second end, and said lateral support members forming a forked portion adapted to embrace an upright member of said gantry.

* * * * *